US012790040B2

(12) United States Patent
Hardt et al.

(10) Patent No.: US 12,790,040 B2
(45) Date of Patent: Nov. 10, 2026

(54) METHODS AND APPARATUS FOR ONBOARD CAMERA CALIBRATION

(71) Applicant: The Boeing Company, Arlington, VA (US)

(72) Inventors: Michael William Hardt, Colmenar Viejo (ES); Marta Palomar Toledano, Valencia (ES); Carlos Querejeta Masaveu, Madrid (ES)

(73) Assignee: The Boeing Company, Arlington, VA (US)

( * ) Notice: Subject to any disclaimer, the term of this patent is extended or adjusted under 35 U.S.C. 154(b) by 142 days.

(21) Appl. No.: 18/481,074

(22) Filed: Oct. 4, 2023

(65) Prior Publication Data

US 2025/0115380 A1 Apr. 10, 2025

(51) Int. Cl.

*B64U 20/87* (2023.01)
*G06T 7/246* (2017.01)
*G06T 7/30* (2017.01)
*G06V 10/25* (2022.01)
*G06V 10/74* (2022.01)

(52) U.S. Cl.

CPC .............. *B64U 20/87* (2023.01); *G06T 7/251* (2017.01); *G06T 7/30* (2017.01); *G06V 10/25* (2022.01); *G06V 10/74* (2022.01)

(58) Field of Classification Search

CPC .................... G06V 10/74; G06V 10/25; G06T 2207/10032; G06T 7/80; G06T 7/251; G06T 7/30

See application file for complete search history.

(56) References Cited

U.S. PATENT DOCUMENTS

| | | | | |
|---|---|---|---|---|
| 9,607,219 | B2 * | 3/2017 | Greveson | H04N 7/18 |
| 9,661,228 | B1 * | 5/2017 | Klivington | G06T 5/50 |
| 9,830,715 | B2 * | 11/2017 | Benhimane | G06T 7/251 |
| 10,002,431 | B2 * | 6/2018 | Sridhar | G01B 11/2545 |
| 10,311,297 | B2 * | 6/2019 | Greveson | G06F 18/22 |
| 10,475,209 | B2 * | 11/2019 | Shen | G06T 7/80 |
| 10,657,422 | B2 * | 5/2020 | Garrison | G06V 20/188 |

(Continued)

FOREIGN PATENT DOCUMENTS

WO 2014049372 A1 4/2014

OTHER PUBLICATIONS

Triggs, "Autocalibration from Planar Scenes," European Conference on Computer Vision (ECCV '98), Jun. 1998, 21 pages.

(Continued)

*Primary Examiner* — Philip P. Dang
(74) *Attorney, Agent, or Firm* — Hanley, Flight & Zimmerman, LLC

(57) ABSTRACT

Methods and apparatus for onboard camera calibration are disclosed. A disclosed apparatus for use with an aircraft includes interface circuitry communicatively coupled to a camera of the aircraft, the camera to capture an image, machine readable instructions, and programmable circuitry to at least one of instantiate or execute the machine readable instructions to generate randomized images from images stored in a data storage carried by the aircraft, determine at least one relationship between an image captured by the camera while the aircraft is in flight and the randomized images, and determine a parameter of the camera based on the at least one relationship to calibrate the camera.

23 Claims, 10 Drawing Sheets

(56) References Cited

U.S. PATENT DOCUMENTS

| | | | | |
|---|---|---|---|---|
| 10,943,360 | B1 * | 3/2021 | Crozier | E02F 3/32 |
| 10,955,241 | B2 * | 3/2021 | Turalba | G01C 11/02 |
| 11,006,104 | B2 * | 5/2021 | Sommerlade | G06T 7/73 |
| 11,024,187 | B2 * | 6/2021 | Staudinger | B64D 47/08 |
| 11,455,745 | B2 * | 9/2022 | Javan Roshtkhari | G06T 7/38 |
| 11,712,213 | B2 * | 8/2023 | Barak | A61B 1/00158 382/128 |
| 11,800,246 | B2 * | 10/2023 | Paris | G01C 11/02 |
| 11,823,448 | B2 * | 11/2023 | Wolfson | G06F 18/2163 |
| 11,861,896 | B1 * | 1/2024 | Wang | B64C 39/024 |
| 11,924,561 | B2 * | 3/2024 | Beziaeva | G06T 1/20 |
| 12,045,311 | B2 * | 7/2024 | Olsen | G06T 3/4076 |
| 12,051,181 | B2 * | 7/2024 | Cowan | G06T 7/0002 |
| 12,080,137 | B2 * | 9/2024 | Cowan | G06F 16/29 |
| 12,106,517 | B2 * | 10/2024 | Feldman | G06T 7/80 |
| 12,139,271 | B2 * | 11/2024 | Khosla | G06V 20/17 |
| 12,207,021 | B2 * | 1/2025 | Karube | G06V 20/17 |
| 12,244,958 | B2 * | 3/2025 | Vyas | G06T 3/608 |
| 12,333,587 | B2 * | 6/2025 | Grant | G06N 20/00 |
| 12,340,576 | B2 * | 6/2025 | Desai | G06F 18/2148 |
| 12,392,907 | B2 * | 8/2025 | Noghabi | G01S 19/14 |
| 12,394,029 | B2 * | 8/2025 | Sukhov | G06T 17/05 |
| 2023/0394708 | A1 * | 12/2023 | Zamora | G06T 5/20 |
| 2024/0037820 | A1 * | 2/2024 | Casas | G06T 11/10 |
| 2024/0103156 | A1 * | 3/2024 | Bowers | G01S 13/9005 |
| 2024/0119700 | A1 * | 4/2024 | Olsen | G06T 5/00 |
| 2024/0169508 | A1 * | 5/2024 | Nayak | G06T 7/0002 |
| 2024/0354890 | A1 * | 10/2024 | Brunschwiler | G06V 10/764 |
| 2024/0364418 | A1 * | 10/2024 | Hsieh | H04B 7/18521 |
| 2024/0378884 | A1 * | 11/2024 | Dey | G06F 18/00 |

OTHER PUBLICATIONS

Bocquillon et al., “Towards a Guaranteed Solution to Plane-Based Self-calibration,” ACCV, 2006, 11 pages.

Herrera et al., “Forget the checkerboard: practical self-calibration using a planar scene,” IEEE Winter Conference on Applications of Computer Vision (WACV), 2016, 9 pages.

Zhang, “A Flexible New Technique for Camera Calibration,” Microsoft Research, Technical Report MSR-TR-98-71, Aug. 13, 2008, 22 pages.

Yang et al., “Camera calibration using a planar target with pure translation,” Optical Society of America, Applied Optics, vol. 58, No. 31, Nov. 1, 2019, 9 pages.

Lowe, “Object Recognition from Local Scale-Invariant Features,” Proc. of the International Conference on Computer Vision, Corfu, Sep. 1999, 8 pages.

Muja et al., “Fast Approximation Nearest Neighbors with Automatic Algorithm Configuration,” International Conference on Computer Vision Theory and Applications, 2009, 10 pages.

Ding et al., “Homography-Based Minimal-Case Relative Pose Estimation With Known Gravity Direction,” IEEE Transactions on Pattern Analysis and Machine Intelligence, vol. 44, No. 1, Jan. 2022, 15 pages.

Palomar et al., “Camera Autocalibration using Predominantly Planar Aerial Imagery,” IEEE AIAA 42nd Digital Avionics Systems Conference (DASC), 2023, 8 pages.

European Patent Office, “Extended European Search Report,” issued in connection with European Patent Application No. 24196270.3, dated Feb. 12, 2025, 9 pages.

* cited by examiner

METHODS AND APPARATUS FOR ONBOARD CAMERA CALIBRATION

FIELD OF THE DISCLOSURE

This disclosure relates generally to onboard cameras of aircraft and, more particularly, to methods and apparatus for onboard camera calibration.

BACKGROUND

Autonomous aircraft, such as unmanned aerial vehicles (UAVs), typically employ redundancy in their navigation systems. To that end, camera systems are often utilized as a secondary source of information for navigation of an aircraft. However, such known camera systems can necessitate significant calibration, which is usually performed in a laboratory setting, and can be relatively time-consuming and/or result in significant downtime of the aircraft.

SUMMARY

An example apparatus for use with an aircraft includes interface circuitry communicatively coupled to a camera of the aircraft, the camera to capture an image, machine readable instructions, and programmable circuitry to at least one of instantiate or execute the machine readable instructions to generate randomized images from images stored in a data storage carried by the aircraft, determine at least one relationship between an image captured by the camera while the aircraft is in flight and the randomized images, and determine a parameter of the camera based on the at least one relationship to calibrate the camera.

An example non-transitory machine readable storage medium includes instructions to cause programmable circuitry to at least generate randomized images from images stored in a data storage carried by an aircraft, determine at least one relationship between an image captured by a camera of the aircraft while the aircraft is in flight and the randomized images, and determine a parameter of the camera based on the at least one relationship to calibrate the camera.

An example method includes generating, by executing instructions with programmable circuitry, randomized images from images stored in a data storage carried by an aircraft, determining, by executing instructions with the programmable circuitry, at least one relationship between an image captured by a camera of the aircraft while the aircraft is in flight and the randomized images, and determining, by executing instructions with the programmable circuitry, a parameter of the camera based on the at least one relationship to calibrate the camera.

Figure 1:
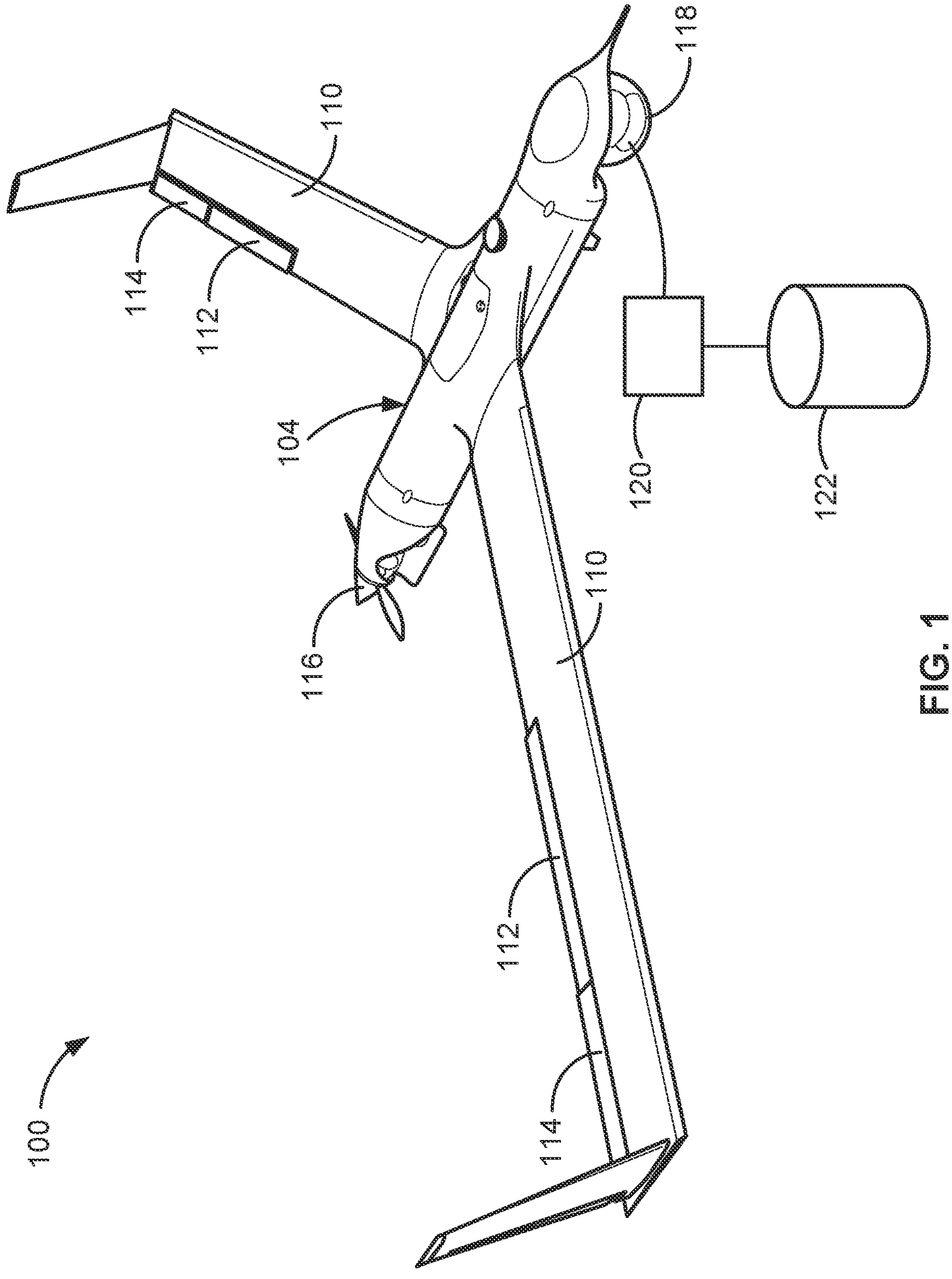
FIG. 1 is an example platform in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus for onboard camera calibration are disclosed. Aircraft that utilize visual-based camera systems for navigation and perception capabilities can necessitate relatively accurate calibrations of such camera systems for position and velocity calculations. Camera degradation during operation (e.g., resulting from vibrations, temperature changes, varifocals, etc.) can cause relatively small and/or incremental shifts in the optical parameters.

During flight at relatively high altitudes, a near planar terrain view from a perspective of an aircraft is a common scenario as downward facing cameras at relatively high altitude view the terrain and, as a result, the view of the terrain approximates a planar scene. In known systems, onboard cameras can view a runway, which can also represent a predominantly planar scene. These scenarios can present geometrical advantages for calibration of a camera of the aircraft and can present significant limitations. Although intrinsic properties of the camera can be estimated when a runway is in view, only a moderate estimate of a distortion model of the camera can be obtained. Further, these known methodologies can be ineffective during relatively horizontal flight at relatively mid-level to high altitudes, which is highly prevalent in aviation. Other known systems correct singularities presented at these altitudes by assuming knowledge and/or awareness of accurate relative displacements between camera images. However, utilization of the relative displacements can be restrictive and/or necessitate significant hardware or computational resources.

Examples disclosed herein can efficiently and effectively calibrate (e.g., autocalibrate) cameras of vehicles during motion thereof. Examples disclosed herein can be utilized in a wide range of altitudes, including relatively higher altitudes. Examples disclosed herein can efficiently calibrate a camera during flight and/or motion of a vehicle, thereby reducing or eliminating a need for stationary and/or ground-based calibration thereof, which can lead to downtime, as well as significant labor and costs.

Examples disclosed herein utilize image registration in combination with optical calibration (e.g., homography-based calibration, a homography analysis, etc.). In particular, image registration is a technique to determine an alignment between images of the same scene from different sources (e.g., different perspectives, different viewpoints, etc.). According to examples disclosed herein, the combination of feature identification and matching enables transformation of the images to a common coordinate system. Examples disclosed herein combine and align images from two different sources, including an image captured by an onboard camera of an aircraft/vehicle and a sample/stored image(s) (e.g., a stored satellite image, a reference image, a database image, an orthoimage, a georeferenced terrain image, etc.). The sample/stored image(s) can be a previously obtained image that is substantially planar. In turn, examples disclosed herein determine relationships (e.g., positional relationships, etc.) between the image captured by the onboard camera and the sample/stored image(s) (e.g., transformed and/or randomized versions of the sample/stored image(s)). The determined relationships are, in turn, utilized to calibrate the onboard camera via a homography-based calibration, for example (e.g., for determination of intrinsic properties of the onboard camera). As a result of calibration, parameters including a distortion model, and/or a pose estimation model can be determined and/or generated, for example. Accordingly, examples disclosed herein enable calibration of the onboard camera while the aircraft/vehicle is in motion and/or flight.

In some examples, first points of the image from the onboard camera are compared to second points of the sample/stored image(s) and/or the transformed sample/stored image(s) to determine the relationship. In some examples disclosed herein, output of the camera is corrected and/or adjusted based on the relationship. In some examples, a distortion model of the camera is generated. Additionally or alternatively, a position of the camera and/or the aircraft is determined (e.g., the position of the aircraft is determined based on a known/assumed spatial relationship between a body of the aircraft and the camera).

FIG. 1 is an example platform 100 in which examples disclosed herein can be implemented. In the example of FIG. 1, the platform 100 is an unmanned aerial vehicle (UAV) 104. Although the example of FIG. 1 depicts a UAV, the example platform 100 could be any other vehicle or movable platform including, but not limited to, manned aircraft, rotorcraft. autonomous vehicles, remote control (RC) vehicles, automobiles, water vessels such as boats, submarines, etc.

The example UAV 104 includes at least one lifting surface (e.g., a wing) 110 for maneuvering thereof as the UAV 104 is self-guided (e.g., autonomously controlled). It should also be understood that other non-aerial vehicle platforms do not include lifting surfaces (e.g., a quadcopter, a rocket, etc.). The example UAV 104 further includes control surfaces 112, 114 and a propulsion system 116. The propulsion system 116 may be implemented by a propeller, a reciprocating engine, a turbine, an electric motor, rocket propulsion, etc.

The UAV 104 of FIG. 1 also includes an image sensor system 118. In the example of FIG. 1, the image sensor system 118 is an onboard camera (e.g., a monocular camera) capable of recording video and/or images. In the illustrated example, the camera 118 is utilized for navigation. According to examples disclosed herein, a controller 120 is communicatively coupled to the camera 118, as well as a data storage 122. As will be discussed in greater detail below in connection with FIGS. 2-10, examples disclosed herein utilized stored images (e.g., stored georeferenced satellite images, etc.) in combination with at least one image obtained/captured by the camera 118 to calibrate the camera 118. Accordingly, examples disclosed herein can advantageously determine camera parameters including, but not limited to, properties (e.g., intrinsic camera properties, extrinsic camera properties, etc.), generated estimated distortion models of the camera 118, etc. while the UAV 104 is in flight, etc.

Figure 2:
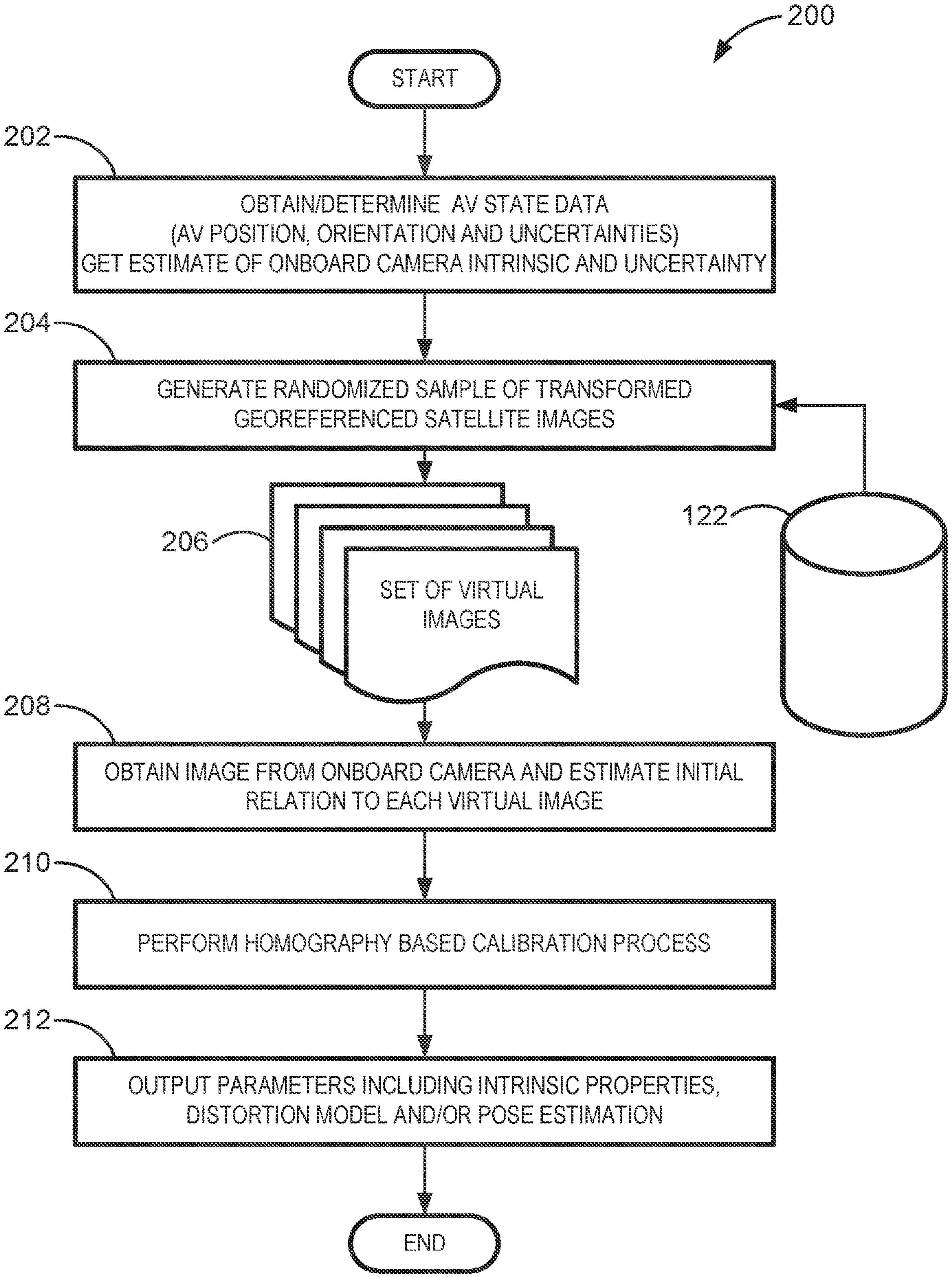
FIG. 2 is a block diagram of an example process flow to calibrate a camera in accordance with teachings of this disclosure.

FIG. 2 is a block diagram of an example process flow 200 to track and classify objects in accordance with teachings of this disclosure. The example process flow 200 can be implemented by the example controller 120 and/or the camera 118 of FIG. 1. In this example, a combination of image registration and homography-based calibration techniques is utilized to calibrate the camera 118 while the UAV 104 (of FIG. 1) is in flight.

At step 202, state data (e.g., a flight parameter) of the UAV 104 is obtained and/or determined (e.g., via instrumentation and/or the controller 120 of the UAV 104), for example. According to examples disclosed herein, the state data can include, but is not limited to a flight parameter, a position, an orientation, an altitude, an attitude, uncertainties, etc. In some examples, estimates of intrinsic properties and/or uncertainty of the camera 118, which can correspond to default/manufacturing values, are obtained and/or determined.

At step 204, according to examples disclosed herein, a randomized sample of transformed position-referenced images are generated to define a set of virtual images 206. In this particular example, georeferenced satellite images, which are orthoimages stored in an onboard satellite imagery database of the aforementioned data storage 122, are transformed. The employment of transformed orthoimagery from a georeferenced dataset can provide a benefit as camera poses and their intrinsic properties are well known for these images and, thus, they can provide additional information for autocalibration, such as the real/actual 3D coordinates of the feature points that are employed to compute the homographies between images, thereby increasing an accuracy of a homography-based method.

At step 208, in this example, an image from the camera 118 (shown in FIG. 1) is obtained and/or captured. Accordingly, in some examples, a relationship between the image captured by the camera 118 is estimated with respect to ones of the aforementioned virtual images 206 (e.g., an initial estimate of the relationship is determined based on points of the image captured by the camera 118 and the virtual images 206).

According to the illustrated example of FIG. 2, at step 210, a homography-based calibration process is performed (e.g., in substantially real time). According to examples disclosed herein, the homography-based calibration process is utilized to obtain intrinsic properties of the camera 118 including, but not limited to, focal lengths, principal point coordinates, etc. Additionally or alternatively, corresponding distortion parameters and/or distortion model of the camera 118 are determined and/or generated. In some examples, pose and/or extrinsic parameters of the camera can be determined for calibration of the camera 118.

At step 212, output from the calibration process of step 210 is provided and the example process flow 200 ends. According to some examples disclosed herein, the output can include intrinsic information with respect to the camera 118, a distortion model of the camera 118 and/or a pose estimation of the camera 118, etc. However, any other appropriate parameter, value(s), expressions/equations and/or output for calibration and/or adjustment of output of the camera 118 can be implemented instead.

Figure 3:
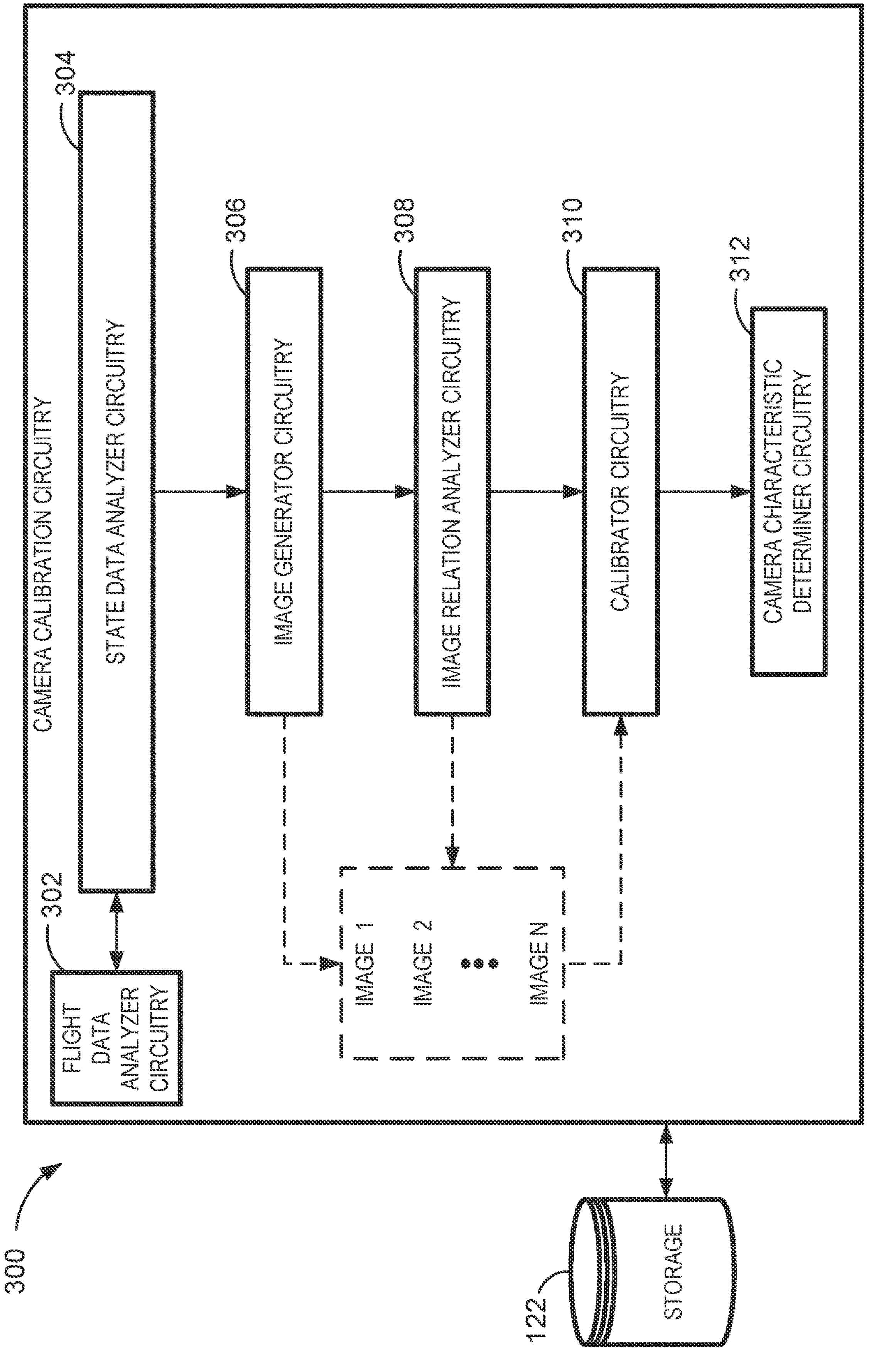
FIG. 3 is a block diagram of example camera calibration circuitry in accordance with teachings of this disclosure.

FIG. 3 is a block diagram of example camera calibration circuitry 300 to calibrate the camera 118 during flight and/or movement of the UAV 104. The camera calibration circuitry 300 can be implemented in the controller 120 shown in FIG. 1, for example. The camera calibration circuitry 300 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the camera calibration system of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The camera calibration circuitry 300 of the illustrated example includes example flight data analyzer circuitry 302, example state data analyzer circuitry 304, example image generator circuitry 306, example image relation analyzer circuitry 308, example calibrator circuitry 310, and example camera characteristic determiner circuitry 312. In this example, the camera calibration circuitry 300 includes and/or communicatively coupled to the data storage 122.

The example flight data analyzer circuitry 302 is implemented to obtain and/or access flight data of the UAV 104. In this example, the flight data analyzer circuitry 302 accesses, retrieves and/or receives data from instrumentation and/or sensors of the UAV 104. In some examples, the flight data analyzer circuitry 302 is instantiated by programmable circuitry executing flight data analyzer circuitry instructions and/or configured to perform operations such as those represented by the flowcharts of FIGS. 6 and 7.

The state data analyzer circuitry 304 of the illustrated example determines and/or calculates state data of the UAV 104 based on the data obtained and/accessed by the flight data analyzer circuitry 302. According to some examples disclosed herein, the state data analyzer circuitry 304 determines and/or calculates parameters including, but not limited to, a position, an orientation and/or uncertainties of the UAV 104. However, any other appropriate parameters/state data can be utilized instead. In some examples, the state data analyzer circuitry 304 is instantiated by programmable circuitry executing state data analyzer instructions and/or configured to perform operations such as those represented by the flowcharts of FIGS. 6 and 7.

In the illustrated example of FIG. 3, the image generator circuitry 306 generates transformed randomized samples of stored images (e.g., stored georeferenced satellite or aerial images) stored in the aforementioned data storage 122. In particular, the example image generator 306 generates a randomized sample of georeferenced satellite images, which are transformed. According to examples disclosed herein, a sampling of N transformed satellite images is generated based on the position and the attitude (e.g., along with their corresponding uncertainties) of the camera 118. Additionally or alternatively, the images are generated based on estimated camera intrinsic properties (e.g., focal length, principal point, etc.), In some examples, the images are randomized by varying pose and intrinsic parameters in a substantially random manner. In some examples, the image generator circuitry 306 is instantiated by programmable circuitry executing image generator instructions and/or configured to perform operations such as those represented by the flowcharts of FIGS. 6 and 7

In this example, the image relation analyzer circuitry 308 determines a relationship (e.g., an initial relationship) between a baseline image (or a plurality of images) captured by the camera 118 and the generated image sampling from the image generator circuitry 306. In this example, the baseline image captured by the camera 118 includes at least a degree of textures and/or features. According to some examples disclosed herein, at least one image of the aforementioned generated image sampling is adjusted/transformed/processed based on the image captured by the camera 118. In some examples, the image relation analyzer circuitry 308 is instantiated by programmable circuitry executing image relation instructions and/or configured to perform operations such as those represented by the flowcharts of FIGS. 6 and 7.

According to examples disclosed herein, the calibrator circuitry 310 is implemented to calibrate the camera 118 based on the aforementioned relationship. In this example, the calibrator circuitry 310 calibrates the camera via example stages described below.

In a first example stage of calibration performed by the calibrator circuitry 310, features are extracted and/or feature matching is performed. In this example, for each of a plurality of images including a baseline image obtained by the onboard camera 118 and the generated images, feature points are extracted (e.g., feature points exceeding a significance threshold). In some examples, the feature points are extracted using a Scale Invariant Feature Transform (SIFT) methodology, which is mentioned in "Object recognition from local scale-invariant features." Proceedings of the Seventh IEEE International Conference on Computer Vision 2 pp. 1150-1157, 1999, which is hereby incorporated by reference. Subsequently, according to examples disclosed herein, a matching algorithm as described in "Fast Approximate Nearest Neighbors with Automatic Algorithm Configuration," International Conference on Computer Vision Theory and Applications, 2009, which is hereby incorporated by reference, can be utilized to obtain the correspondences between feature points at each generated image with the feature points at the baseline image. An example result of this procedure is described below in connection with FIG. 5B.

In a second example stage of calibration performed by the calibrator circuitry 310, homographies are computed by utilizing the image coordinates of the matched points and the information provided by the generated images (e.g., via a known or assumed calibration). In this example stage, the homographies between each generated image and the baseline are computed.

In a third example stage of calibration, a projective bundle adjustment is performed by the calibrator circuitry 310. In this example stage, distortion effects (that were not taken into account in the previous example stage) are taken into account. This example bundle adjustment process, which can include a non-linear minimization, is performed to refine the estimated coordinates of the principal point and the parameters of the distortion model.

In a fourth example stage of calibration, a homography-based autocalibration is performed by the calibrator circuitry 310. In this example stage, an initial guess of the camera's focal lengths is computed and the coordinates of the principal point are re-corrected, thereby achieving a first estimate of an intrinsic matrix. In this example, distortion is ignored and/or not included in the calculations as the distortion was already compensated for in the previous example stage.

In a fifth example calibration stage, metric reconstruction is performed by the calibrator circuitry 310 utilizing the initial estimate of the aforementioned intrinsic matrix for the baseline image. In this example, an estimation of the rotation and translation, which correspond to extrinsic parameters of the camera 118 with respect to the virtual cameras of the generated images, is obtained. Based on these extrinsic parameters, an estimation of the 3D position of the feature points can be computed in world coordinates and/or a world reference frame, for example.

In a sixth example calibration stage, to finalize the calibration, a metric bundle adjustment is performed by the calibrator circuitry 310. The purpose of this example stage is to refine the 3D coordinates of the points in scene and the intrinsic and extrinsic properties of the camera 118 in relatively simultaneous manner. Examples disclosed herein can advantageously utilize known parameters of the generated image that provide the actual 3D coordinates for each feature point, thereby constraining reprojection error by a non-linear optimization, for example. In some examples, the calibrator circuitry 310 is instantiated by programmable circuitry executing calibrator instructions and/or configured to perform operations such as those represented by the flowcharts of FIGS. 6 and 7.

In this example, camera characteristic determiner circuitry 312 is implemented to output parameters, such as properties (e.g., focal length, intrinsic properties, extrinsic properties, etc.), of the camera 118 for calibration thereof. In particular, the output parameters can be utilized by camera 118 for calibration while the UAV 104 is in flight. In some examples, the camera characteristic determiner circuitry 312 adjusts output of the camera 118 based on the parameters of the camera 118. Additionally or alternatively, the camera characteristic determiner circuitry 312 determines a position of the UAV 104 and/or the camera 118 based on extrinsic properties of the camera 118 (e.g., in combination with known geometric relationships of the UAV 104). In some examples, the camera characteristic determiner circuitry 312 is instantiated by programmable circuitry executing camera characteristic determiner instructions and/or configured to perform operations such as those represented by the flowcharts of FIGS. 6 and 7.

Figure 4:
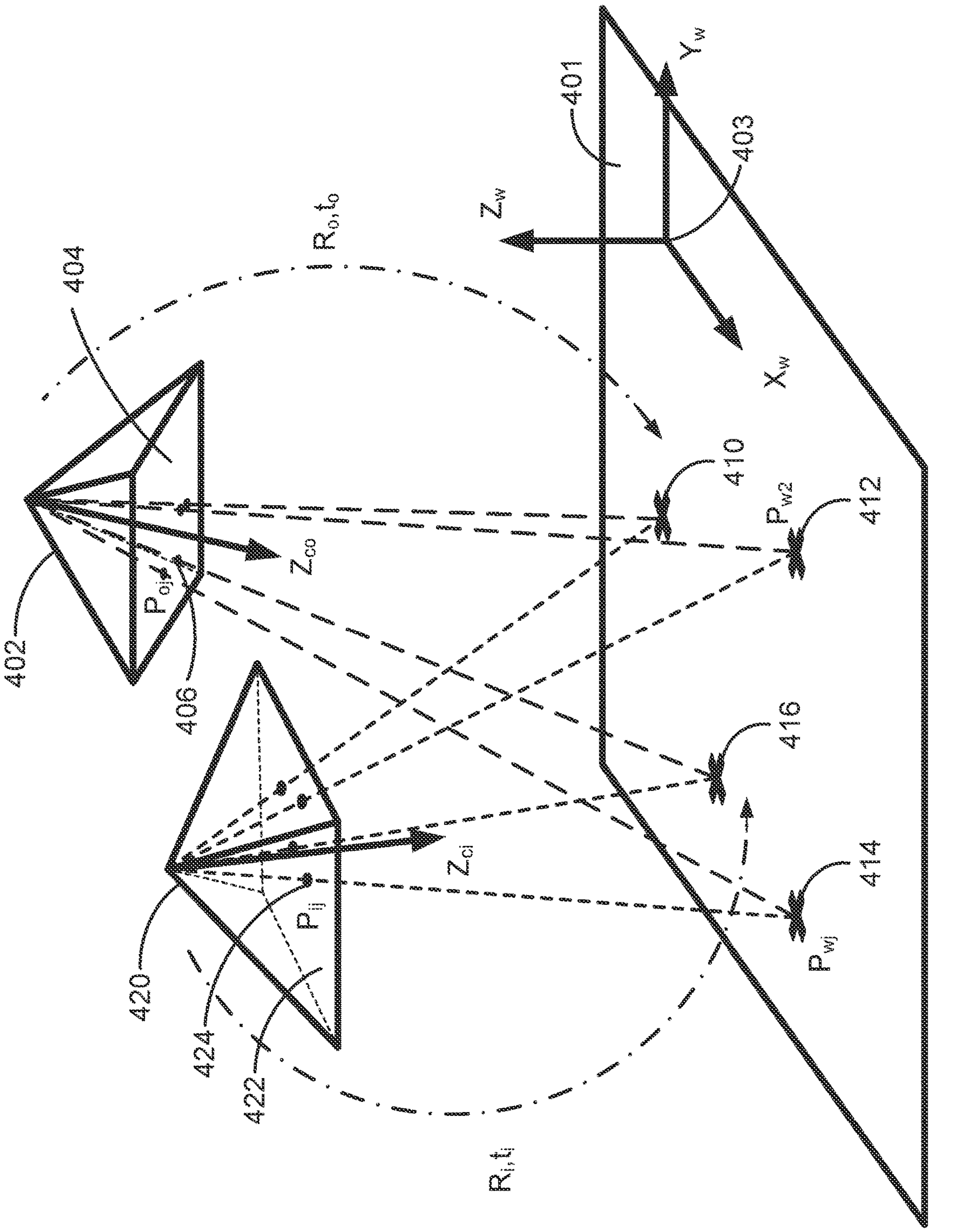
FIG. 4 illustrates an example analytical framework that can be implemented in examples disclosed herein.

FIG. 4 illustrates an example analytical framework that can be implemented in examples disclosed herein. In the illustrated example of FIG. 4, a planar surface (e.g., a ground surface depicted with texture features and/or textures) 401 is shown with a reference coordinate system 403. In this example, a representation 402 of a first viewpoint is shown with a viewing plane 404 and projected points 406 corresponding to feature points 410, 412, 414, 416. Further, a representation 420 of a second viewpoint different from the first viewpoint includes a viewing plane 422 with projected points 424 corresponding to the aforementioned feature points 410, 412, 414, 416. Examples disclosed herein utilize differences of the first and second representations 402, 420 with respect to the feature points 410, 412, 414, 416 to analyze, calculate and/or characterize differences between the aforementioned first and second viewpoints.

Figure 5A:
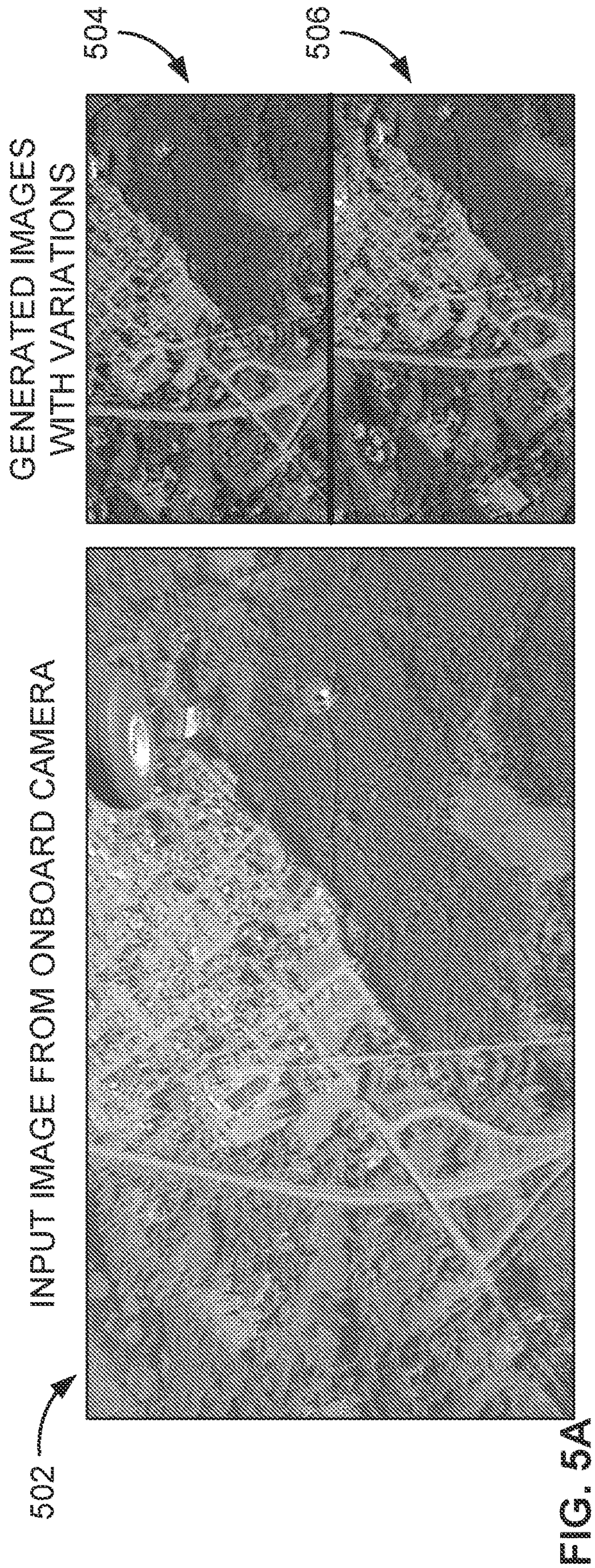
FIGS. 5A and 5B illustrate example aspects of image processing that can be implemented in examples disclosed herein.
Figure 5B:
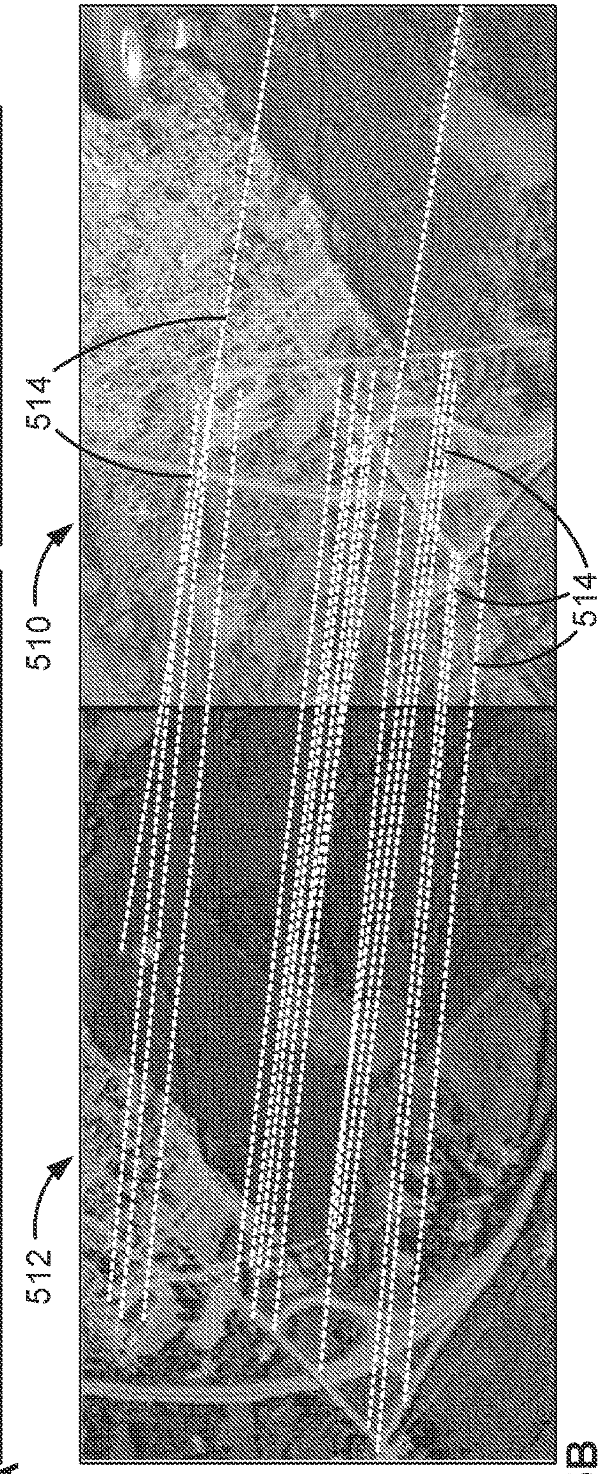

FIGS. 5A and 5B illustrate example aspects of image processing that can be implemented in examples disclosed herein. Turning to FIG. 5A, an example generation of transformed satellite images is shown. In the illustrated example of FIG. 5A, an input/captured image 502 captured by the camera 118 (e.g., an image from the onboard monocular camera 118 that is yet to be calibrated) is shown along with generated/transformed images 504, 506. In this example, the images 504, 506 are images that are generated with different variations (e.g., random variations). The variations can correspond to intrinsic or extrinsic properties of the UAV 104, for example.

FIG. 5B depicts example matching between feature points in a baseline captured image 510 from the onboard camera 118 and one of generated images 512. In this example, lines 514 indicate correspondences between feature points of the baseline captured image 510 and the generated image 512. As mentioned above in connection with FIG. 3, these correspondences can be generated utilizing the SIFT methodology in combination with the FLANN matching algorithm. However, any other feature point extraction/matching methodology and/or algorithm can be implemented instead.

While an example manner of implementing the camera calibration circuitry 300 of FIG. 3 is illustrated in FIG. 3, one or more of the elements, processes, and/or devices illustrated in FIG. 3 may be combined, divided, re-arranged, omitted, eliminated, and/or implemented in any other way. Further, the example flight data analyzer circuitry 302, the example state data analyzer circuitry 304, the example image generator circuitry 306, the example image relation analyzer circuitry 308, the example calibrator circuitry 310, the example camera characteristic determiner 312, and/or, more generally, the example camera calibration circuitry 300 of FIG. 3, may be implemented by hardware alone or by hardware in combination with software and/or firmware. Thus, for example, any of the example flight data analyzer circuitry 302, the example state data analyzer circuitry 304, the example image generator circuitry 306, the example image relation analyzer circuitry 308, the example calibrator circuitry 310, the example camera characteristic determiner 312, and/or, more generally, the example camera calibration circuitry 300, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example camera calibration circuitry 300 of FIG. 3 may include one or more elements, processes, and/or devices in addition to, or instead of, those illustrated in FIG. 3, and/or may include more than one of any or all of the illustrated elements, processes and devices.

Figure 6:
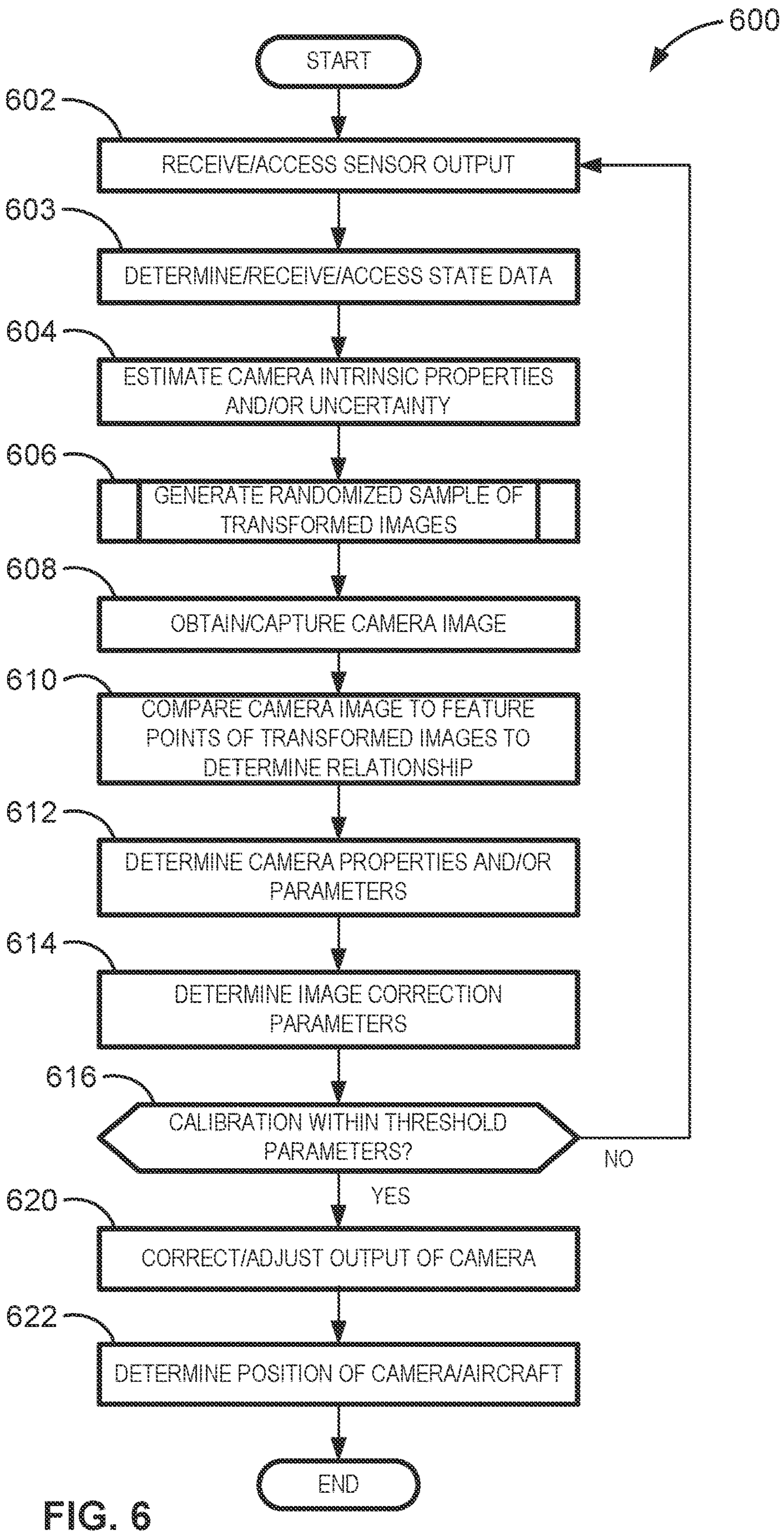
FIGS. 6 and 7 are flowcharts representative of example machine readable instructions and/or example operations that may be executed, instantiated, and/or performed by example programmable circuitry to implement the camera calibration circuitry of FIG. 3.
Figure 7:
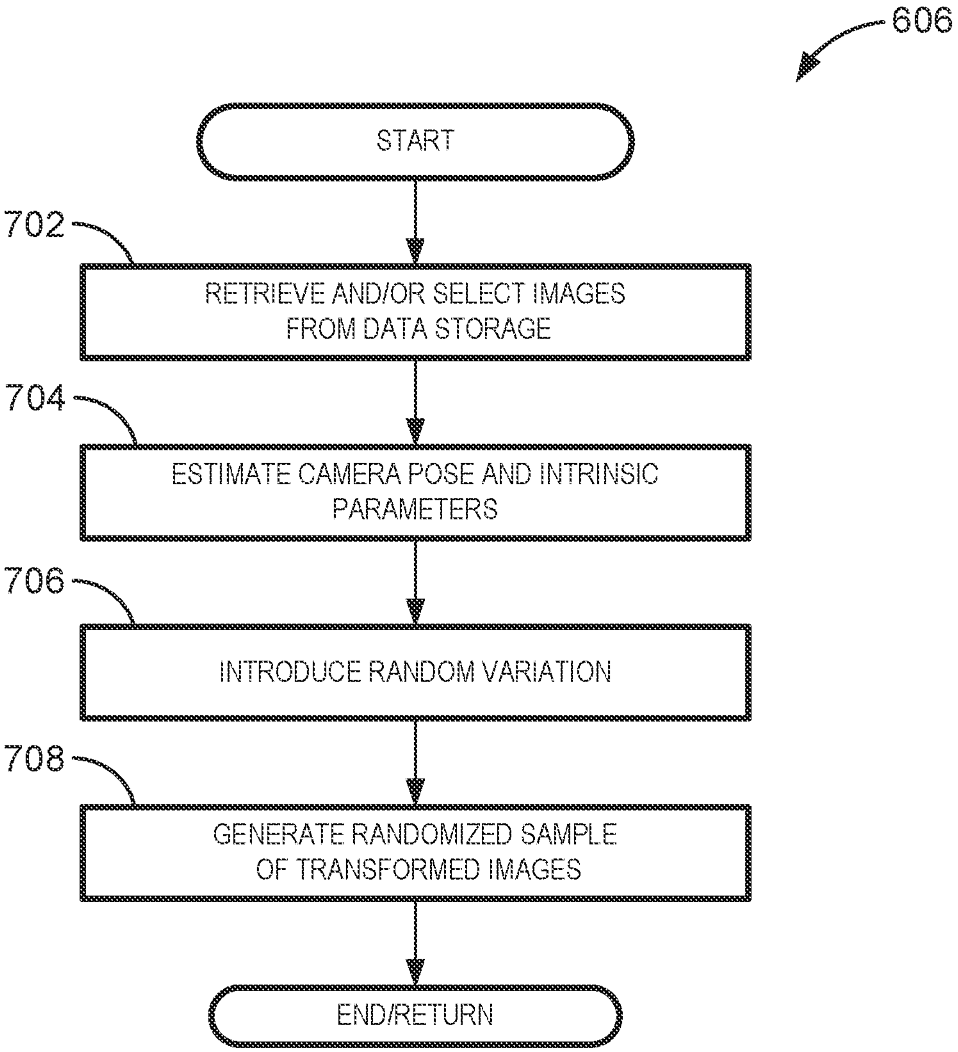

Flowcharts representative of example machine readable instructions, which may be executed by programmable circuitry to implement and/or instantiate the camera calibration circuitry 300 of FIG. 3 and/or representative of example operations which may be performed by programmable circuitry to implement and/or instantiate the camera calibration circuitry 300 of FIG. 3, are shown in FIGS. 6 and 7. The machine readable instructions may be one or more executable programs or portion(s) of one or more executable programs for execution by programmable circuitry such as the programmable circuitry 812 shown in the example processor platform 800 discussed below in connection with FIG. 8 and/or may be one or more function(s) or portion(s) of functions to be performed by the example programmable circuitry (e.g., an FPGA) discussed below in connection with FIGS. 9 and/or 10. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIGS. 6 and 7, many other methods of implementing the example camera calibration circuitry 300 may alternatively be used. For example, the order of execution of the blocks of the flowcharts may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms “non-transitory computer readable storage device” and “non-transitory machine readable storage device” are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term “device” refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 6 is a flowchart representative of example machine readable instructions and/or example operations 600 that may be executed, instantiated, and/or performed by programmable circuitry to autocalibrate the camera 118. The example machine-readable instructions and/or the example operations 600 of FIG. 6 begin at block 602, at which the flight data analyzer circuitry 302 receives and/or accesses output from a flight sensor and/or flight instrumentation of the UAV 104

At block 603, the state data analyzer circuitry 304 determines, and/or calculates state data of the UAV 104. In this example, the state data is determined by the state data analyzer circuitry 304 based on the output from the flight sensor and/or flight instrumentation of the UAV 104 and/or data forwarded from the flight data analyzer circuitry 302.

At block 604, in some examples, the state data analyzer circuitry 304 estimates intrinsic properties and/or uncertainty of the camera 118. In some such examples, the camera intrinsic properties and/or the uncertainty is estimated based on default/assumed characteristics of the camera 118 (e.g., prior calibration data, default properties, etc.).

At block 606, the example image generator circuitry 306 generates a randomized sample of transformed images (e.g., randomized images, randomized transformed images, etc.), as will be discussed in greater detail below in connection with FIG. 7. In some examples, the randomized sample of transformed images are based on a collection of georeferenced satellite images stored in the data storage 122.

At block 608, the flight data analyzer circuitry 302 causes the camera 118 to obtain/capture an image (e.g., a baseline image) while the UAV 104 is in flight and/or moving. Additionally or alternatively, the flight data analyzer circuitry 302 obtains and/or accesses the image from the camera 118.

At block 610, the image relation analyzer circuitry 308 determines at least one relationship between the obtained/captured image and the randomized sample of transformed images by comparing the captured image to feature points of the transformed images. In this example, first points of the randomized sample are compared to second points of the captured image to determine the at least one relationship.

At block 612, the calibrator circuitry 310 determines camera properties and/or parameters based on the at least one relationship determined by the image relation analyzer circuitry 308 (block 610). In this example, the camera properties and/or parameters are to be utilized for calibration of the camera 118.

At block 614, the example calibrator circuitry 310 determines image correction parameters to calibrate the camera 118.

At block 616, the calibrator circuitry 310 of the illustrated example determines whether the calibration of the camera 118 is within threshold parameters. If the calibration is within threshold parameters, control of the process proceeds to block 620. Otherwise, the process returns to block 602 (or, alternatively, the process returns to block 603, block 604 or block 606).

At block 620, in some examples, the camera characteristic determiner circuitry 312 corrects/adjusts output of the camera 118. For example, the camera characteristic determiner circuitry 312 utilizes the calibration, the properties and/or the parameters of the camera 118 to adjust data and/or output of the camera 118 for guidance of the UAV 104.

At block 622, according to some examples disclosed herein, the camera characteristic determiner circuitry 312 determines a position of the camera 118 and/or the UAV 104 and the process ends. According to some examples disclosed herein, the positioned of the UAV 104 is calculated based on a determined position of the camera 118 in conjunction with a known/presume spatial relationship between the camera 118 and a body or other feature/component of the UAV 104.

FIG. 7 is a flowchart representative of the example machine readable instructions and/or example operations 606 that may be executed, instantiated, and/or performed by programmable circuitry to generate randomized/transformed images for autocalibration of the camera 118. The example machine-readable instructions and/or the example operations 606 of FIG. 7 begin at block 702, at which the example image generator circuitry 306 retrieves and/or selects images (e.g., orthonormal satellite images with corresponding geopositional data) from the data storage 122. In some examples, the image generator circuitry 306 selects the images based on flight data and/or state data of the UAV 104. In a particular example, the image generator circuitry 306 selects the images from a collection of images stored in the data storage 122 based on a position and attitude (or other flight parameter) corresponding to the camera 118 and/or the UAV 104.

At block 704, the example image generator circuitry 306 estimates pose and intrinsic parameters of the camera 118 for use with the selected images. According to examples disclosed herein, the pose and intrinsic parameters are estimated (e.g., roughly estimated) and this estimation can be utilized as a starting point for subsequent random variation(s).

At block 706, the example image generator circuitry 306 introduces random variation to select a set of camera poses and intrinsic parameter configurations for generating images. In some examples, the random variation is based on the estimated pose and the intrinsic parameters.

At block 708, the example image generator circuitry 306 generates transformed images (e.g., transformed synthetic/virtual images) subsequent to introducing random variation to the selected images. In turn, the process ends/returns.

Figure 8:
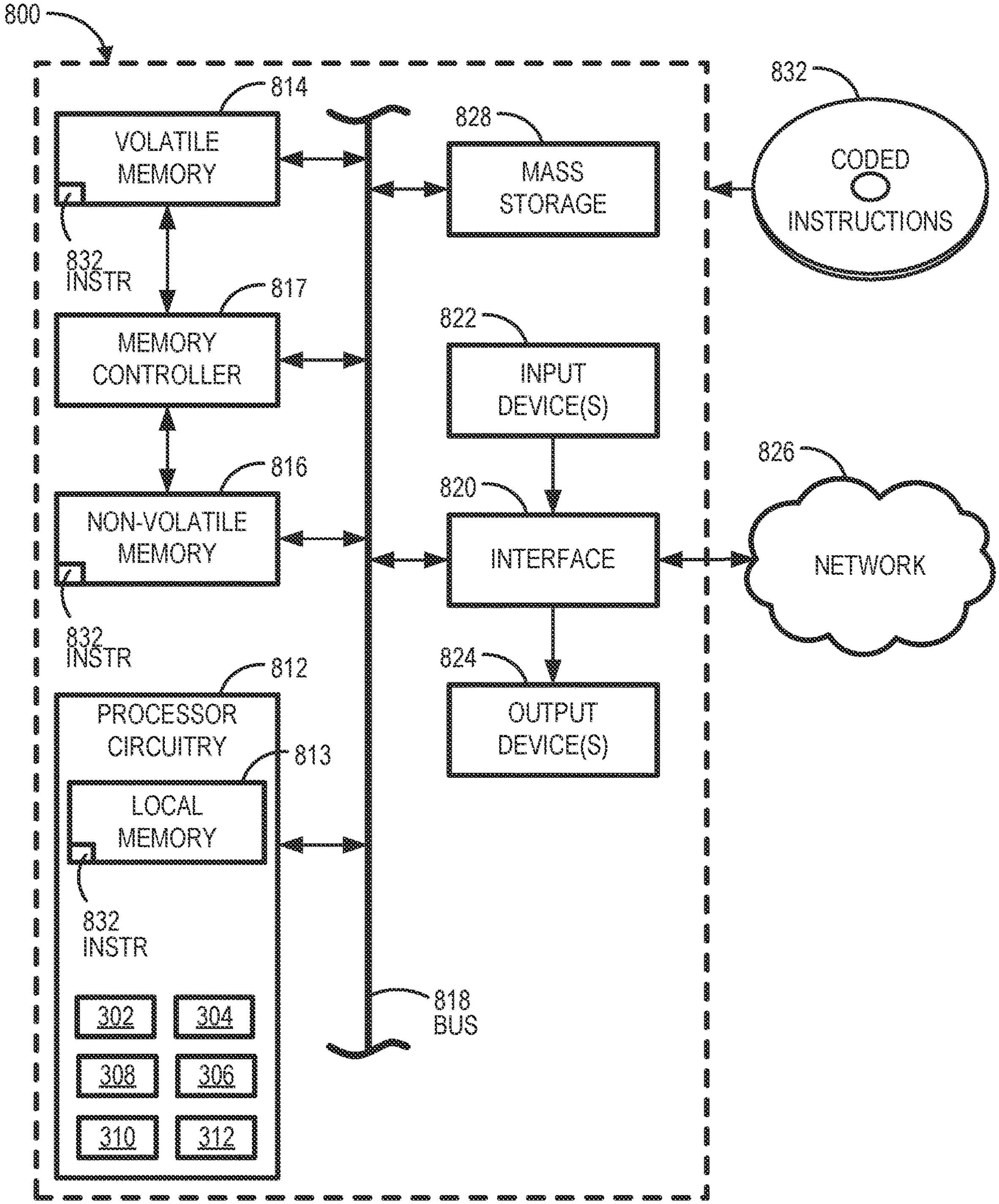
FIG. 8 is a block diagram of an example processing platform including programmable circuitry structured to execute, instantiate, and/or perform the example machine readable instructions and/or perform the example operations of FIGS. 6 and 7 to implement the camera calibration circuitry of FIG. 3.

FIG. 8 is a block diagram of an example programmable circuitry platform 800 structured to execute and/or instantiate the example machine-readable instructions and/or the example operations of FIGS. 6 and 7 to implement the camera calibration circuitry 300 of FIG. 3. The programmable circuitry platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the example flight data analyzer circuitry 302, the example state data analyzer circuitry 304, the example image generator circuitry 306, the example image relation analyzer circuitry 308, the example calibrator circuitry 310, and the example camera characteristic determiner circuitry 312.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIGS. 6 and 7, may be stored in the mass storage device 828, in the volatile memory 814, in the non-volatile memory 816, and/or on at least one non-transitory computer readable storage medium such as a CD or DVD which may be removable.

Figure 9:
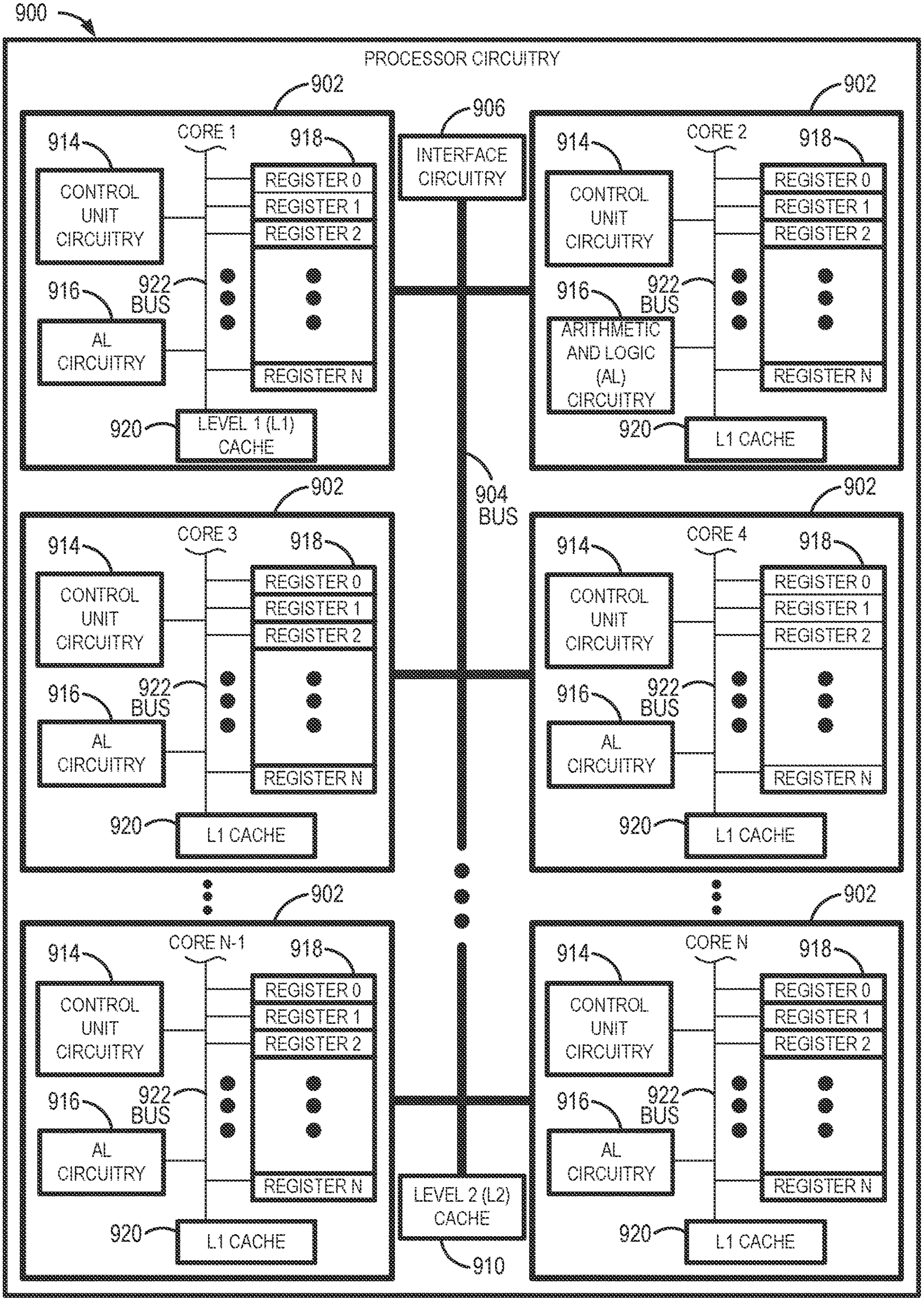
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowcharts of FIGS. 6 and 7 to effectively instantiate the circuitry of FIG. 3 as logic circuits to perform operations corresponding to those machine readable instructions. In some such examples, the circuitry of FIG. 3 is instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register (s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be onboard the microprocessor 900, in the same chip package as the microprocessor 900 and/or in one or more separate packages from the microprocessor 900.

Figure 10:
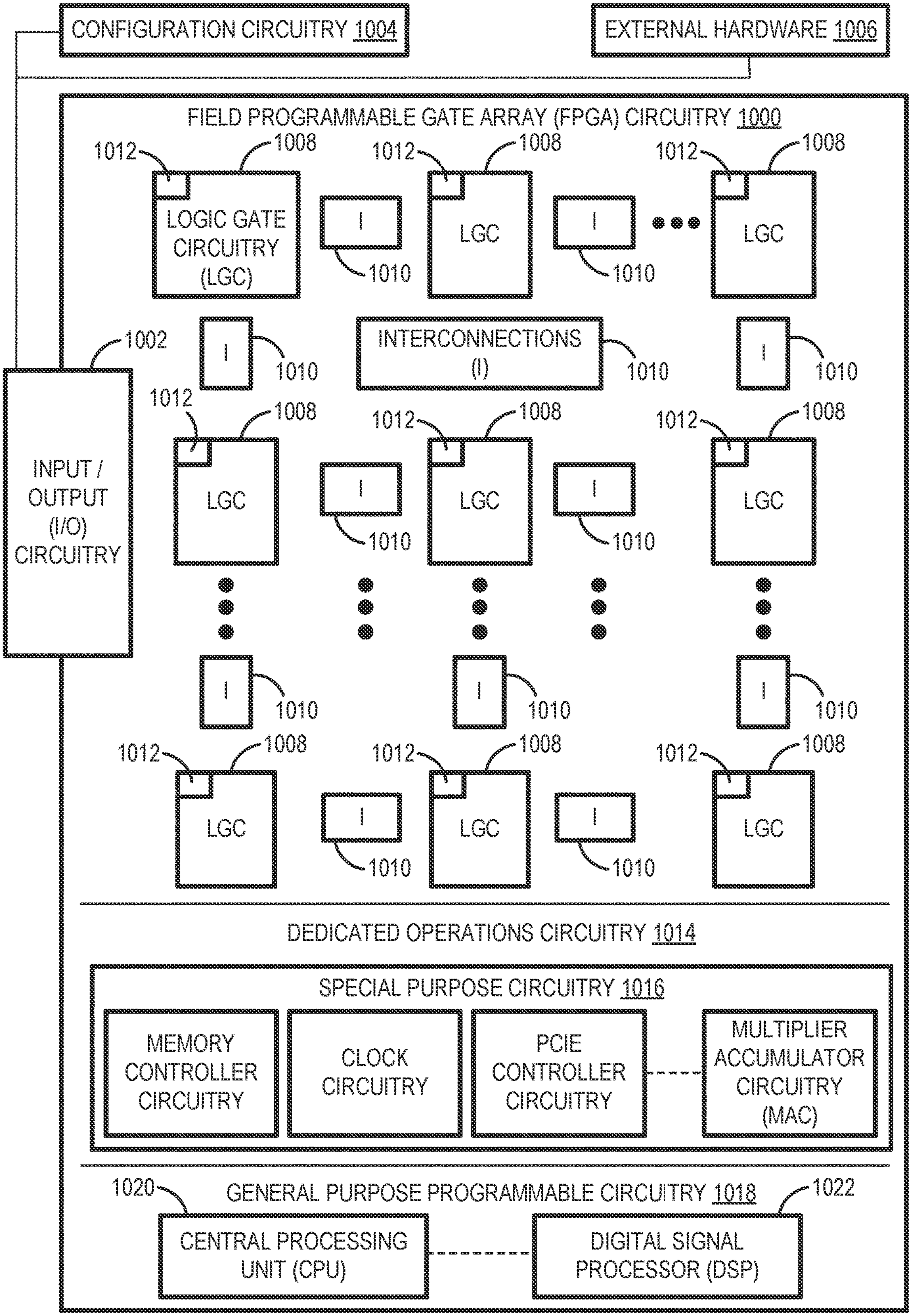
FIG. 10 is a block diagram of another example implementation of the programmable circuitry of FIG. 8.

FIG. 10 is a block diagram of another example implementation of the programmable circuitry 812 of FIG. 8. In this example, the programmable circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6 and 7 but whose interconnections and logic circuitry are fixed once fabricated), the FPGA circuitry 1000 of the example of FIG. 10 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 6 and 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 6 and 7. As such, the FPGA circuitry 1000 may be configured and/or structured to effectively instantiate some or all of the operations/functions corresponding to the machine readable instructions of the flowcharts of FIGS. 6 and 7 as dedicated logic circuits to perform the operations/functions corresponding to those software instructions in a dedicated manner analogous to an ASIC. Therefore, the FPGA circuitry 1000 may perform the operations/functions corresponding to the some or all of the machine readable instructions of FIGS. 6 and 7 faster than the general-purpose microprocessor can execute the same.

In the example of FIG. 10, the FPGA circuitry 1000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain a binary file, which may be implemented by a bit stream, data, and/or machine-readable instructions, to configure the FPGA circuitry 1000, or portion(s) thereof. In some such examples, the configuration circuitry 1004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1006 may be implemented by external hardware circuitry. For example, the external hardware 1006 may be implemented by the microprocessor 900 of FIG. 9.

The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations/functions that may correspond to at least some of the machine readable instructions of FIGS. 6 and 7 and/or other desired operations. The logic gate circuitry 1008 shown in FIG. 10 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations/functions. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example dedicated operations circuitry 1014. In this example, the dedicated operations circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the programmable circuitry 812 of FIG. 8, many other approaches are contemplated. For example, FPGA circuitry may include an onboard CPU, such as one or more of the example CPU 1020 of FIG. 9. Therefore, the programmable circuitry 812 of FIG. 8 may additionally be implemented by combining at least the example microprocessor 900 of FIG. 9 and the example FPGA circuitry 1000 of FIG. 10. In some such hybrid examples, one or more cores 902 of FIG. 9 may execute a first portion of the machine readable instructions represented by the flowcharts of FIGS. 6 and 7 to perform first operation(s)/function(s), the FPGA circuitry 1000 of FIG. 10 may be configured and/or structured to perform second operation(s)/function(s) corresponding to a second portion of the machine readable instructions represented by the flowcharts of FIGS. 6 and 7, and/or an ASIC may be configured and/or structured to perform third operation(s)/function(s) corresponding to a third portion of the machine readable instructions represented by the flowcharts of FIGS. 6 and 7.

It should be understood that some or all of the circuitry of FIG. 3 may, thus, be instantiated at the same or different times. For example, same and/or different portion(s) of the microprocessor 900 of FIG. 9 may be programmed to execute portion(s) of machine-readable instructions at the same and/or different times. In some examples, same and/or different portion(s) of the FPGA circuitry 1000 of FIG. 10 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 900 of FIG. 9 may execute machine readable instructions in one or more threads executing concurrently and/or in series. In some examples, the FPGA circuitry 1000 of FIG. 10 may be configured and/or structured to carry out operations/functions concurrently and/or in series. Moreover, in some examples, some or all of the circuitry of FIG. 3 may be implemented within one or more virtual machines and/or containers executing on the microprocessor 900 of FIG. 9.

In some examples, the programmable circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the programmable circuitry 812 of FIG. 8, which may be in one or more packages. For example, the XPU may include a CPU (e.g., the microprocessor 900 of FIG. 9, the CPU 1020 of FIG. 10, etc.) in one package, a DSP (e.g., the DSP 1022 of FIG. 10) in another package, a GPU in yet another package, and an FPGA (e.g., the FPGA circuitry 1000 of FIG. 10) in still yet another package.

Example methods, apparatus, systems, and articles of manufacture to enable autocalibration of cameras on vehicles are disclosed herein. Further examples and combinations thereof include the following:

Example 1 includes an apparatus for use with an aircraft, the apparatus comprising interface circuitry communicatively coupled to a camera of the aircraft, the camera to capture an image, machine readable instructions, and programmable circuitry to at least one of instantiate or execute the machine readable instructions to generate randomized images from images stored in a data storage carried by the aircraft, determine at least one relationship between an image captured by the camera while the aircraft is in flight and the randomized images, and determine a parameter of the camera based on the at least one relationship to calibrate the camera.

Example 2 includes the apparatus of example 1, wherein the programmable circuitry is to determine first points of the randomized images, determine second points of the captured image, and compare the first points to the second points to determine the at least one relationship.

Example 3 includes the apparatus of example 1, wherein the programmable circuitry is to at least one of correct or adjust output of the camera based on the parameter.

Example 4 includes the apparatus of example 1, wherein the at least one relationship is determined by performing a homography analysis of the image captured by the camera and the randomized images.

Example 5 includes the apparatus of example 1, wherein the programmable circuitry is to generate the randomized images by selecting ones of orthoimages stored in the data storage based on a flight parameter of the aircraft.

Example 6 includes the apparatus of example 1, wherein the programmable circuitry is to generate a distortion model of the camera based on the at least one relationship.

Example 7 includes the apparatus of example 1, wherein the programmable circuitry is to reconstruct a scene corresponding to the randomized images.

Example 8 includes a non-transitory machine readable storage medium comprising instructions to cause programmable circuitry to at least generate randomized images from images stored in a data storage carried by an aircraft, determine at least one relationship between an image captured by a camera of the aircraft while the aircraft is in flight and the randomized images, and determine a parameter of the camera based on the at least one relationship to calibrate the camera.

Example 9 includes the non-transitory machine readable storage medium of example 8, wherein the instructions cause the programmable circuitry to determine first points of the randomized images, determine second points of the captured image, and compare the first points to the second points to determine the at least one relationship.

Example 10 includes the non-transitory machine readable storage medium of example 8, wherein the instructions cause the programmable circuitry to at least one of correct or adjust output of the camera based on the parameter.

Example 11 includes the non-transitory machine readable storage medium of example 8, wherein the at least one relationship is determined by performing a homography analysis of the image captured by the camera and the randomized images.

Example 12 includes the non-transitory machine readable storage medium of example 8, wherein the instructions cause the programmable circuitry to generate the randomized images by selecting ones of orthoimages stored in the data storage based on a flight parameter of the aircraft.

Example 13 includes the non-transitory machine readable storage medium of example 9, wherein the instructions cause the programmable circuitry to generate a distortion model of the camera based on the at least one relationship.

Example 14 includes the non-transitory machine readable storage medium of example 9, wherein the instructions cause the programmable circuitry to reconstruct a scene corresponding to the randomized images.

Example 15 includes a method comprising generating, by executing instructions with programmable circuitry, randomized images from images stored in a data storage carried by an aircraft, determining, by executing instructions with the programmable circuitry, at least one relationship between an image captured by a camera of the aircraft while the aircraft is in flight and the randomized images, and determining, by executing instructions with the programmable circuitry, a parameter of the camera based on the at least one relationship to calibrate the camera.

Example 16 includes the method of example 15, further including determining, by executing instructions with the programmable circuitry, first points of the randomized images, determining, by executing instructions with the programmable circuitry, second points of the captured image, and comparing, by executing instructions with the programmable circuitry, the first points to the second points to determine the at least one relationship.

Example 17 includes the method of example 15, further including at least one of correcting or adjusting, by executing instructions with the programmable circuitry, output of the camera based on the parameter.

Example 18 includes the method of example 15, wherein the at least one relationship is determined by performing a homography analysis of the image captured by the camera and the randomized images.

Example 19 includes the method of example 15, wherein the randomized images are generated by selecting ones of orthoimages stored in the data storage based on a flight parameter of the aircraft.

Example 20 includes the method of example 15, further including generating, by executing instructions with the programmable circuitry, a distortion model of the camera based on the at least one relationship.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of referencing a semiconductor device (e.g., a transistor), a semiconductor die containing a semiconductor device, and/or an integrated circuit (IC) package containing a semiconductor die during fabrication or manufacturing, "above" is not with reference to Earth, but instead is with reference to an underlying substrate on which relevant components are fabricated, assembled, mounted, supported, or otherwise provided. Thus, as used herein and unless otherwise stated or implied from the context, a first component within a semiconductor die (e.g., a transistor or other semiconductor device) is "above" a second component within the semiconductor die when the first component is farther away from a substrate (e.g., a semiconductor wafer) during fabrication/manufacturing than the second component on which the two components are fabricated or otherwise provided. Similarly, unless otherwise stated or implied from the context, a first component within an IC package (e.g., a semiconductor die) is "above" a second component within the IC package during fabrication when the first component is farther away from a printed circuit board (PCB) to which the IC package is to be mounted or attached. It is to be understood that semiconductor devices are often used in orientation different than their orientation during fabrication. Thus, when referring to a semiconductor device (e.g., a transistor), a semiconductor die containing a semiconductor device, and/or an integrated circuit (IC) package containing a semiconductor die during use, the definition of "above" in the preceding paragraph (i.e., the term "above" describes the relationship of two parts relative to Earth) will likely govern based on the usage context.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time +1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable effective camera calibration while a vehicle is in motion or in flight. Examples disclosed herein can increase an accuracy of camera calibration. Examples disclosed herein can also be highly effective in a runway landing scenario, amongst other scenarios. Examples disclosed herein can enable the accurate estimation of distortion models. Examples disclosed herein can easily be embedded on an aircraft or other vehicles and can be operated prior to execution of vision-based navigation procedures to limit a drift in position estimation that is typically caused by uncertainty in camera intrinsic properties. Disclosed systems, apparatus, articles of manufacture, and methods improve the efficiency of using a computing device by enabling computationally efficient onboard analysis of camera images. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus for use with an aircraft, the apparatus comprising:
- interface circuitry communicatively coupled to a camera of the aircraft, the camera to capture an image;
- machine readable instructions; and
- programmable circuitry on the aircraft to be programmed by the machine readable instructions to:
  - generate randomized images from images stored in a data storage carried by the aircraft, the images stored in the data storage corresponding to at least one of satellite or aerial images obtained prior to a flight of the aircraft;
  - determine at least one relationship between an image captured by the camera during the flight of the aircraft and the randomized images, wherein the at least one relationship is determined by performing a homography analysis of the image captured by the camera and the randomized images; and
  - determine a parameter of the camera based on the at least one relationship to calibrate the camera.

2. The apparatus of claim 1, wherein the programmable circuitry is to
- determine first points of the randomized images;
- determine second points of the captured image; and
- compare the first points to the second points to determine the at least one relationship.

3. The apparatus of claim 1, wherein the programmable circuitry is to at least one of correct or adjust output of the camera based on the parameter.

4. The apparatus of claim 1, wherein the programmable circuitry is to generate the randomized images by selecting ones of orthoimages stored in the data storage based on a flight parameter of the aircraft.

5. The apparatus of claim 1, wherein the programmable circuitry is to generate a distortion model of the camera based on the at least one relationship.

6. The apparatus of claim 5, wherein the distortion model is generated by the programmable circuitry while the aircraft is in flight.

7. The apparatus of claim 1, wherein the programmable circuitry is to reconstruct a scene corresponding to the randomized images.

8. The apparatus of claim 7, wherein the scene is reconstructed based on the determining an alignment of images of the scene from different perspectives.

9. The apparatus of claim 1, wherein the programmable circuitry is to generate a set of virtual images based on the randomized images, and wherein the at least one relationship is determined based on the image captured by the camera and the virtual images.

10. The apparatus of claim 1, wherein the programmable circuitry is to perform the homography analysis of the image captured by the camera and the generated randomized images by utilizing image coordinates of matched points and information of the generated randomized images.

11. The apparatus of claim 1, wherein the parameter corresponds to a distortion of the camera.

12. The apparatus of claim 1, wherein the programmable circuitry is to generate a pose estimation model based on the at least one relationship.

13. A non-transitory machine readable storage medium comprising instructions to cause at least one programmable circuitry stored on an aircraft to at least:

generate, at the aircraft, randomized images from images stored in a data storage carried by the aircraft, the images stored in the data storage corresponding to at least one of satellite images or aerial images obtained prior to a flight of the aircraft;

determine, at the aircraft, at least one relationship between an image captured by a camera of the aircraft during the flight of the aircraft and the randomized images, wherein the at least one relationship is determined by performing a homography analysis of the image captured by the camera and the randomized images; and determine, at the aircraft, a parameter of the camera based on the at least one relationship to calibrate the camera.

14. The non-transitory machine readable storage medium of claim 13, wherein the instructions cause one or more of the at least one programmable circuitry to:

determine first points of the randomized images;

determine second points of the captured image; and compare the first points to the second points to determine the at least one relationship.

15. The non-transitory machine readable storage medium of claim 14, wherein the instructions cause one or more of the at least one programmable circuitry to generate a distortion model of the camera based on the at least one relationship.

16. The non-transitory machine readable storage medium of claim 14, wherein the instructions cause one or more of the at least one programmable circuitry to reconstruct a scene corresponding to the randomized images.

17. The non-transitory machine readable storage medium of claim 13, wherein the instructions cause one or more of the at least one programmable circuitry to at least one of correct or adjust output of the camera based on the parameter.

18. The non-transitory machine readable storage medium of claim 13, wherein the instructions cause one or more of the at least one programmable circuitry to generate the randomized images by selecting ones of orthoimages stored in the data storage based on a flight parameter of the aircraft.

19. A method comprising:

generating, by executing instructions with at least one programmable circuitry carried by an aircraft, randomized images from images stored in a data storage carried by the aircraft, the images stored in the data storage corresponding to at least one of satellite images or aerial images obtained prior to a flight of the aircraft;

determining, by executing instructions with one or more of the at least one programmable circuitry, at least one relationship between an image captured by a camera of the aircraft during the flight and the randomized images, wherein the at least one relationship is determined by performing a homography analysis of the image captured by the camera and the randomized images; and determining, by executing instructions with one or more of the at least one programmable circuitry, a parameter of the camera based on the at least one relationship to calibrate the camera.

20. The method of claim 19, further including:

determining, by executing instructions with one or more of the at least one programmable circuitry, first points of the randomized images;

determining, by executing instructions with one or more of the at least one programmable circuitry, second points of the captured image; and comparing, by executing instructions with one or more of the at least one programmable circuitry, the first points to the second points to determine the at least one relationship.

21. The method of claim 19, further including at least one of correcting or adjusting, by executing instructions with one or more of the at least one programmable circuitry, output of the camera based on the parameter.

22. The method of claim 19, wherein the randomized images are generated by selecting ones of orthoimages stored in the data storage based on a flight parameter of the aircraft.

23. The method of claim 19, further including generating, by executing instructions with one or more of the at least one programmable circuitry, a distortion model of the camera based on the at least one relationship.

* * * * *